(12) United States Patent
Hugghins

(10) Patent No.: US 7,455,238 B2
(45) Date of Patent: Nov. 25, 2008

(54) CONTROL SYSTEM AND METHOD FOR MULTISTAGE AIR CONDITIONING SYSTEM

(75) Inventor: Gordon Jeffrey Hugghins, Jacksonville, TX (US)

(73) Assignee: Trane International Inc., Piscataway, NJ (US)

( * ) Notice: Subject to any disclaimer, the term of this patent is extended or adjusted under 35 U.S.C. 154(b) by 645 days.

(21) Appl. No.: 11/257,949

(22) Filed: Oct. 25, 2005

(65) Prior Publication Data

US 2007/0090198 A1 Apr. 26, 2007

(51) Int. Cl.
*F23N 1/00* (2006.01)
*F23N 5/20* (2006.01)
*G05D 23/00* (2006.01)
*G05D 23/32* (2006.01)
*F24H 9/20* (2006.01)
*F24D 5/00* (2006.01)
*F27D 19/00* (2006.01)

(52) U.S. Cl. ............................... 236/15 R; 236/15 BG; 236/46 E; 236/11; 126/116 A; 432/53

(58) Field of Classification Search ............... 236/15 R, 236/15 BG, 46 E, 11, 1 C, 91 R; 126/116 A, 126/110 A, 110 E, 99 R; 432/53
See application file for complete search history.

(56) References Cited

U.S. PATENT DOCUMENTS 4,251,025 A * 2/1981 Bonne et al. .................. 236/14
5,628,201 A * 5/1997 Bahel et al. .................. 62/211

* cited by examiner

*Primary Examiner*—Chen-Wen Jiang
(74) *Attorney, Agent, or Firm*—William O'Driscoll

(57) ABSTRACT

A controller and method for operating an HVAC system including an air conditioning unit, such as a gas furnace, having three stages of heat output and responsive to signals from a single stage or two stage thermostat. The W1, W2, and W3 inputs to the controller may be configured for receipt of a single stage control signal simultaneously or paired as W1, W2 or W2, W3. The system controller is configured to determine which input connection arrangement is in existence and operates the system in mock one stage or mock two stage modes depending on the signals received from a single or two stage thermostat, respectively.

41 Claims, 4 Drawing Sheets

CONTROL SYSTEM AND METHOD FOR MULTISTAGE AIR CONDITIONING SYSTEM

BACKGROUND OF THE INVENTION

Heating, ventilating and air conditioning (HVAC) systems have been developed with multistage furnace sections, as well as multistage cooling sections, for improved efficiency and improved comfort for the occupants of the space being conditioned. With regard to multistage furnaces, for example, initially two stage furnaces were developed but furnace designs have evolved into three stage types which are capable of producing heat at low, medium and high output settings.

The retrofitting of multistage air conditioning systems into existing facilities with single stage thermostats, or thermostats with fewer stages of control signal capability than the capability of the air conditioning system itself, has presented problems for installing HVAC systems in existing facilities, for example. However, HVAC systems with controllers and methods of operation in accordance with the present invention have overcome such problems of the prior art.

SUMMARY OF THE INVENTION

The present invention provides an HVAC system, including a multistage furnace, and a controller therefor, operable to be controlled by a thermostat having fewer stages of control signal output than the system controller.

In accordance with one aspect of the invention, a controller for an HVAC system, including a furnace having at least three stages of firing rate, is adapted to be operated with a thermostat having only a single stage output signal or a two stage output signal, for example. The controller may operate a three stage furnace with a single thermostat control signal.

Further in accordance with the invention, an HVAC system with a multistage furnace having at least three stages of firing rate may operate with a thermostat having two stage output signals in a configuration wherein the first two stages of the furnace controller receive the same signal from the first stage output of the thermostat and the third stage input terminal of the furnace controller receives a signal from the second stage output of the thermostat.

Still further, in accordance with the invention, a controller for a multistage furnace having at least three stages of firing rate is operable to be connected to a two stage thermostat wherein the first or low firing rate stage of the furnace controller is connected to the thermostat for receiving a low firing rate output signal and the second and third stage input terminals of the furnace controller are configured to receive a second or higher stage control signal from the thermostat for commanding firing of a furnace at least two higher rates of heat output.

Still further, the present invention contemplates a system and method for controlling a multistage air conditioning unit, such as a furnace, from a thermostat having only one or two output signals, wherein the controller recognizes multiple configurations of control signals at the controller input terminals when receiving signals from a thermostat having fewer stage output signals than the controller is capable of handling.

Those skilled in the art will further appreciate the above-mentioned advantages and superior features of the invention, together with other important aspects thereof upon reading the detailed description which follows in conjunction with the drawings.

DETAILED DESCRIPTION OF THE PREFERRED EMBODIMENTS

Figure 1:
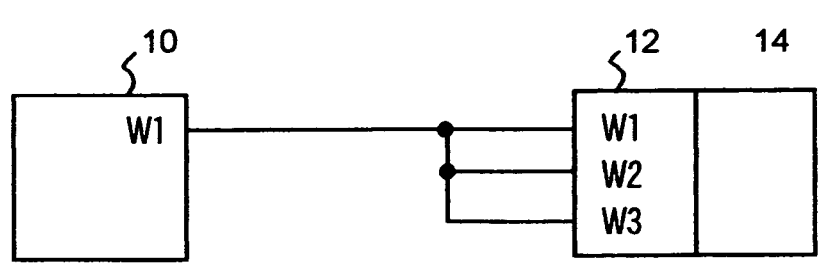
FIG. 1 is diagram illustrating a controller for an HVAC system wherein a signal from a single stage thermostat is input to terminals for receiving signals for a three stage furnace.

In the description which follows, like parts are marked throughout the specification and drawing with the same reference numerals, respectively. The drawing figures are not necessarily to scale and certain features may be shown exaggerated in scale or in somewhat generalized or schematic form in the interest of clarity and conciseness.

Referring to FIG. 1, there is illustrated a preferred manner of connecting a single stage thermostat 10 to a controller 12 for an HVAC system 11, including a three stage air conditioning unit comprising a gas furnace 14. Controller 12 is adapted to receive at least three control signal inputs or terminals, W1, W2 and W3, which are illustrated as being interconnected for receiving a control signal from the single stage thermostat 10 having a single stage signal output terminal also designated as a W1 terminal. Those skilled in the art will recognize that actual thermostats and furnace controllers are interconnected by more signal conductors than those illustrated. However, such other connections are omitted from the description of the present invention in the interest of clarity and conciseness. Still further, a person of ordinary skill in the art will also recognize the applicability of the present invention, as described herein, to such other control lines as typically exist in an HVAC system. The system and method described include a multistage heating unit or furnace, although, it is contemplated that the invention is operable with other multistage air conditioning units, such as a vapor compression air cooling unit or system, for example.

Figure 2:
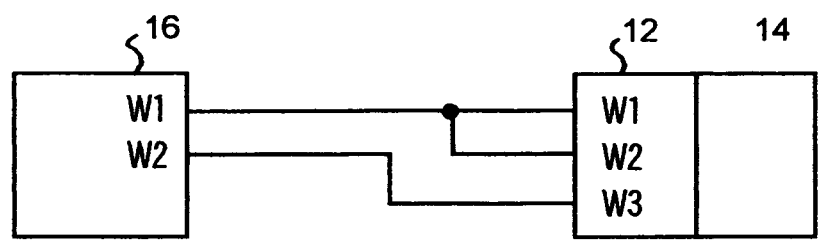
FIG. 2 is a diagram similar to FIG. 1 but showing one arrangement of control line or conductor connections between a two stage thermostat and a three stage furnace controller.

Referring briefly to FIG. 2, there is illustrated an HVAC system 15 including one configuration of connections between a two stage thermostat 16, having control signal output terminals W1 and W2, and the controller 12 wherein the input terminals W1 and W2 of the controller are interconnected. In FIG. 2, signal output terminal W2 of the thermostat 16 is connected to signal input terminal W3 of controller 12.

Figure 3:
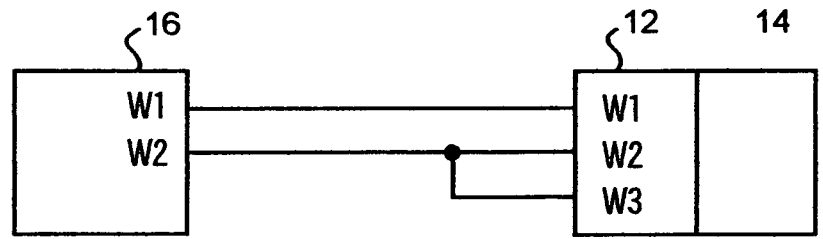
FIG. 3 is a diagram showing another arrangement of control line connections between a two stage thermostat and a controller capable of three stage control of an air conditioning unit, such as a furnace.

Still further, referring to FIG. 3, another configuration of connections between the thermostat 16 and the controller 12 is illustrated wherein terminals W1 of thermostat 16 and controller 12 are interconnected and the signal receiving or input terminals W2 and W3 of the controller are interconnected to receive a signal from terminal W2 of the thermostat.

The control arrangements in accordance with the present invention are particularly adapted for controlling a three stage air conditioning unit, such as a furnace, from a single stage thermostat, such as the thermostat 10 or a two stage thermostat, such as the thermostat 16. However, those skilled in the art will appreciate that furnaces having more than three stages of heat output may operate in accordance with the present invention. Still further, as mentioned hereinbefore, air conditioning systems utilizing other types of air conditioning units capable of operating at three or more stages of heating or cooling effect output may utilize the system and method of the invention. For example, the present invention may be utilized to control a multistage cooling unit by providing input signals to Y1, Y2 and Y3 control lines, for example, not shown.

Figure 4:
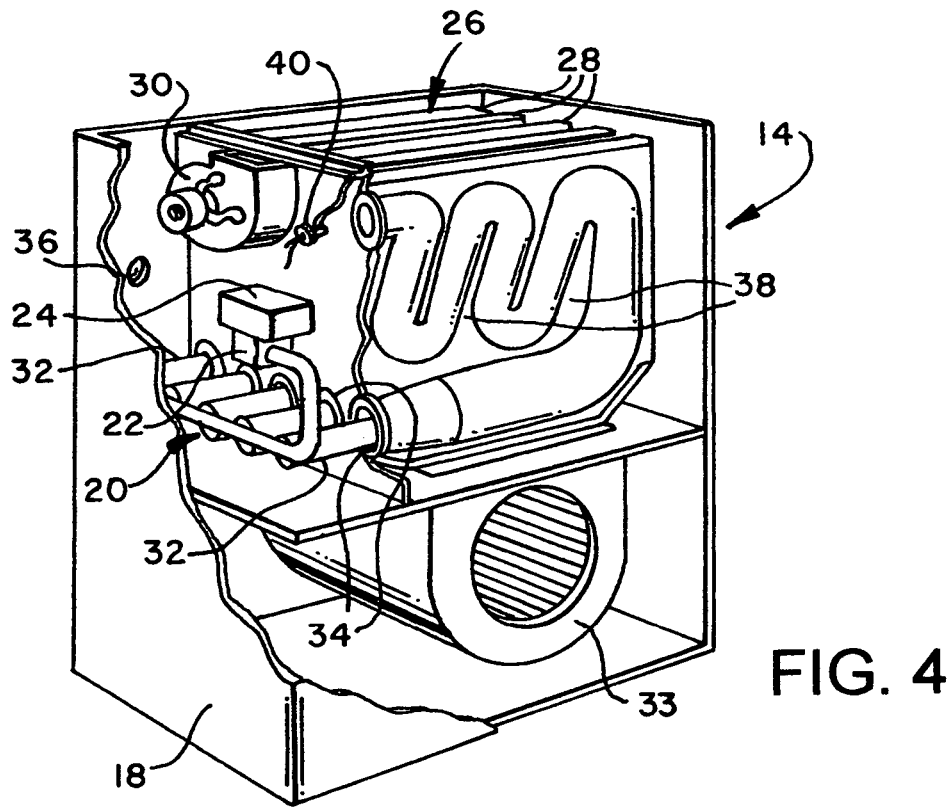
FIG. 4 is a perspective view, partially cutaway of a gas furnace controllable in accordance with the present invention.

Referring briefly to FIG. 4, there is illustrated a gas furnace 14 including a cabinet 18, a combustion system including a burner assembly 20, a gas valve assembly 22 including a valve control unit 24 and a heat exchanger assembly 26, including plural heat exchangers 28. Furnace 14 also includes an induced draft blower or inducer 30 and a circulating air blower 33. Still further, the furnace 14 is provided with multiple burners 32, each having a suitable igniter 34. Combustion air for the burners 32 may enter the cabinet 18 through ports 36, one shown, and gas valve assembly 22 is operable to provide for flow of fuel gas to the burners 32 at least three rates or stages of heat output of the furnace 14. These three rates of heat output may be designated as a first stage or low heat output rate, a second stage or intermediate heat output rate and a third stage or high heat output rate. Heat exchangers 28 include portions which provide a serpentine passage 38, as shown. The inducer 30 pulls flue gasses resulting from combustion through the heat exchangers 28 and discharges same to a chimney, not shown. A pressure sensor 40 is operable to control certain switches for operation of the inducer 30 in accordance with a known control scheme.

Figure 5:
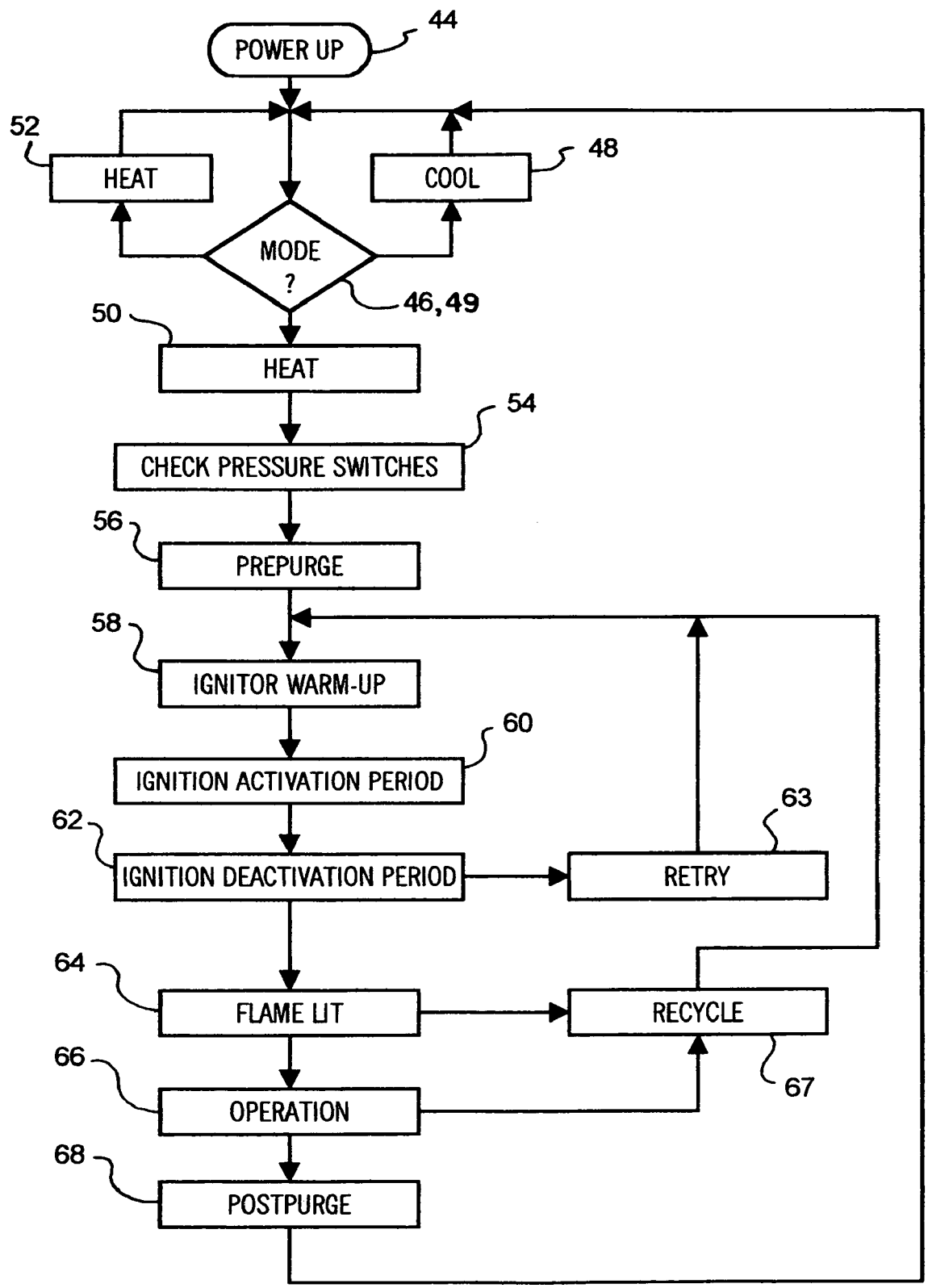
FIG. 5 is a flow diagram showing the general operational characteristics of an integrated controller for an HVAC system operable in accordance with the invention.

Referring to FIG. 5, there is illustrated a generalized flow diagram for operation of an HVAC system utilizing the controller 12 and the furnace 14 as well as the thermostats 10 or 16. Typically, the controller 12, upon power up at step 44, enters a mode of operation step 46 to determine if there is a call for cooling at step 48, or a call for heat at step 50, or some other mode operation at step 52. If the mode of operation determining step 46 indicates there is a call for heat at step 50, then a sequence of events is carried out including step 54 of checking the status of the pressure sensor 40 and associated switches, not shown. Step 50 includes determining if there is a signal present at least at terminal W1 of controller 12, FIGS. 1 through 3. If the aforementioned pressure switches indicate normal function, the inducer 30 is energized to pre-purge the furnace burners and heat exchanger passages at step 56, followed by igniter warmup at step 58, followed by ignition activation at step 60 and followed by ignition deactivation at step 62. Step 60 may include opening a gas flow control valve to a predetermined position. The furnace startup cycle further progresses to retry ignition activation as indicated by step 63 if, at step 62, a flame has not been established. If flame is determined to be present at step 64, the furnace progresses to an operation mode in step 66. The presence of flame is at least periodically monitored and if flame is not present a recycle step 67 may be initiated. Once there is no longer a call for heat, a postpurge step 68 is carried out.

The overall operation of a multistage gas furnace, as described above with regard to FIG. 5, is explained in further detail in U.S. Pat. No. 5,271,556 issued Dec. 21, 1993 to Robert W. Helt et al. and assigned to the assignee of the present invention. The subject matter of U.S. Pat. No. 5,271,556 is incorporated herein by reference.

Figure 6A:
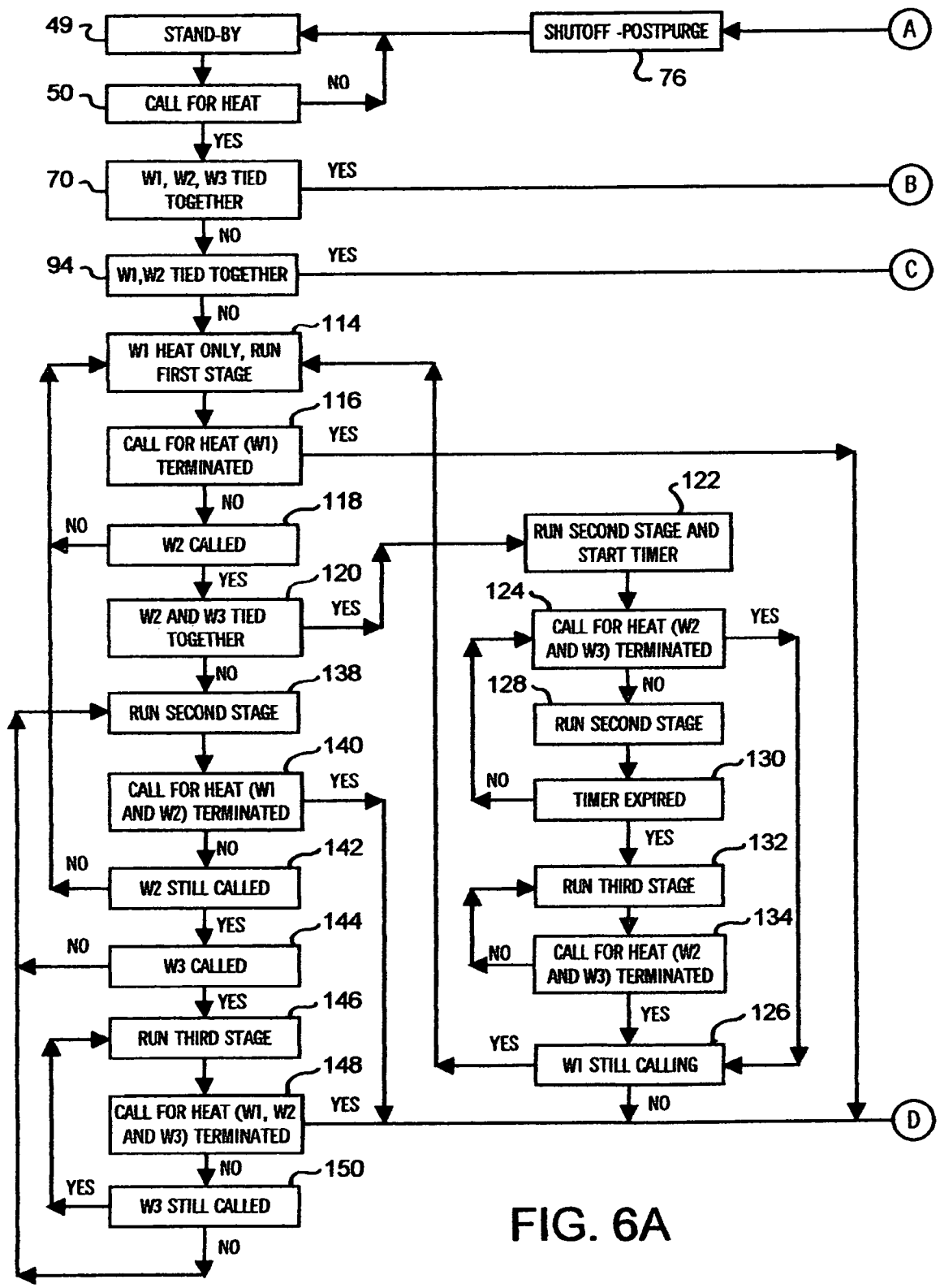
FIGS. 6A and 6B, taken together, comprise a flow diagram illustrating steps of controlling a three stage air conditioning unit from a thermostat capable of a single stage output signal or two stages of output signals.
Figure 6B:
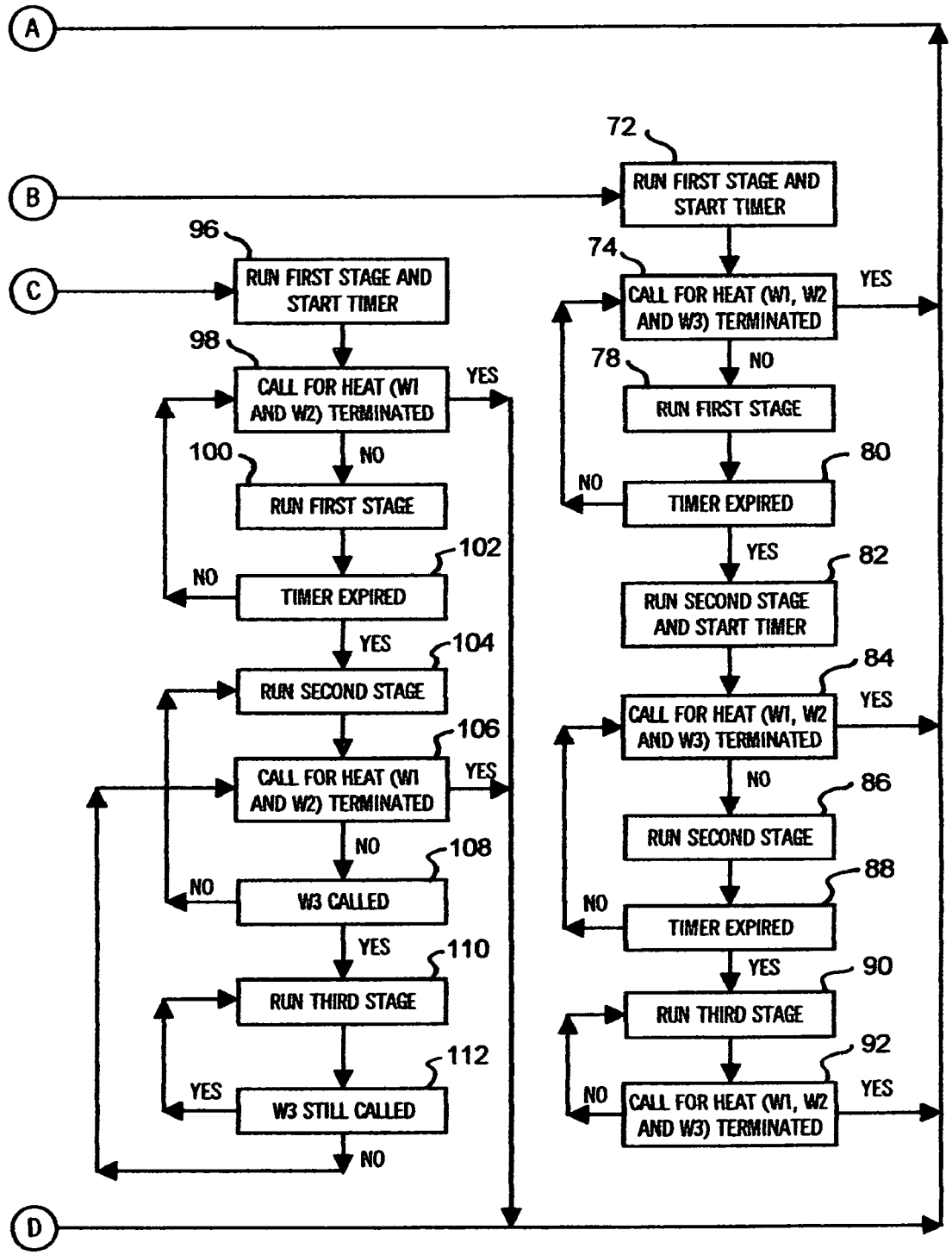

The present invention contemplates that the controller 12 includes a programmable electronic circuit or so called microcontroller of a type commercially available and known to those skilled in the art. Thus, the controller 12 is capable of and includes means for operating a process program for carrying out a process or method as illustrated in FIGS. 6A and 6B. The portions of the flow diagram shown in FIGS. 6A and 6B are interconnected at the encircled letters A, B, C and D. Referring to FIGS. 6A and 6B, the controller 12 may be configured to operate in a standby mode at step 49. For example, if mode query step 46 of FIG. 5 determines the system 11 or 15 is in the heat mode then the system resides in a standby mode 49 until a call for heat signal at step 50. When there is a call for heat by thermostat 10 or 16 at step 50, a query is made to determine if controller signal receiving or input terminals W1, W2 and W3 are all interconnected, as in the arrangement of FIG. 1. The controller 12 may determine such condition by determining the arrival time of signals to each controller input terminal W1, W2 and W3 which, if simultaneous, indicates that the terminals are interconnected. If the controller 12 determines at step 70 that signal input terminals W1, W2 and W3 are interconnected, operation of the furnace 14 is initiated at a first stage heat output rate, as indicated at step 72, FIG. 6B. Commencing with initiation of operation of the furnace 14 at a first stage or low heat output rate the controller 12 also commences a timing cycle at step 72. If, while the timing cycle is in effect and the furnace 14 is running at the first stage or low heat output rate and the call for heat is terminated, as indicated at step 74, then the system 11, for example, will proceed through a shutoff and postpurge cycle, as indicated at step 76. However, if at step 74 the call for heat is not terminated, the furnace 14 continues to operate at the first stage setting as indicated at step 78.

The system and method of the invention includes a query at step 80, FIG. 6B, to determine if the timing cycle has expired. If not, the process reverts to step 74 to determine whether or not a call for heat has been terminated and, if not, the furnace 14 continues to run at the first stage or low heat output rate. If at step 80, the timing cycle has expired and the call for heat has not terminated, the controller 12 initiates operation of the furnace 14 at a second stage or intermediate heat output rate, as indicated at step 82 and a new timing cycle is commenced. Again, the process includes a query at step 84 to determine if the call for heat from thermostat 10 or 16 has been terminated and, if not, the system continues to operate at the second stage or intermediate heat output rate, as indicated at step 86. If the call for heat signal is terminated at step 84, the controller 12 operates the furnace 14 to proceed through the shutoff and postpurge process, as indicated at step 76. If the call for heat has not terminated at step 84, the controller 12 continues to operate the furnace 14 at the second stage setting at step 86 and the program includes a query of the controller 12 to determine if the timing cycle has expired at step 88. If not, and if the call for heat has not terminated, the furnace 14 continues to run at the second or intermediate stage setting and the timing cycle query is continued. However, if at step 88 the timing cycle has expired and the call for heat has not terminated, the controller 12 causes the furnace 14 to begin operation at the third stage or high heat output setting, as indicated at step 90 in FIG. 6B. The furnace 14 continues to operate at this rate while interrogating the thermostat until a call for heat signal is terminated at step 92, for example. If the program queries the system to determine whether or not a call for heat has been terminated, and such has occurred, the controller 12 causes the furnace 14 to enter the shutoff and postpurge process at step 76.

Referring again to FIG. 6A, if, at step 70, the controller 12 receives signals indicating that terminals W1, W2 and W3 are not tied together, it proceeds to step 94 to determine if terminals W1 and W2 are interconnected or tied together. The control process proceeds to step 96, FIG. 6B, if call for heat signals are being received simultaneously at terminals W1 and W2 wherein the furnace 14 is controlled to operate at the first stage or low heat output rate and a timing cycle is initiated. The furnace 14 continues to operate at the low heat or first stage output setting and the program running on the controller 12 monitors the thermostat 16, FIG. 2, for termination of the call for heat signal at step 98 and, if such has been received, the controller 12 causes the furnace 14 to proceed through the shutoff-postpurge step 76. If the call for heat signal is still present, the controller continues to operate the furnace 14 at the first stage setting in step 100 and monitors the operation for expiration of a timing cycle, as indicated at step 102. As indicated in FIG. 6B, if at step 102 the timing cycle has expired and a call for heat signal has not terminated, then the controller 12 causes the furnace 14 to begin operation at a second stage or intermediate heat output setting, as indicated at step 104 in FIG. 6B.

With the system 15 running in a mode wherein the furnace 14 is producing heat at the second stage setting, the controller 12 monitors the process to determine if a call for heat signal from the thermostat has terminated at step 106. If such has occurred, the controller 12 causes the furnace 14 to proceed through the shutoff-postpurge process at step 76. If the call for heat signal has not terminated at step 106, the controller 12 monitors its W3 terminal to determine if a call for heat signal is present at that terminal, as indicated at step 108. If no signal is present at terminal W3 of the controller 12, the controller continues to operate the furnace 14 at the second stage setting while monitoring for termination of a call for heat signal at terminals W1 and W2, as indicated at step 106. If the call for heat signal has terminated at step 106, the controller 12 causes furnace 14 to proceed to step 76. If the call for heat signal is still present on terminals W1 and W2 at step 106, the process moves to step 108 and, if there is a signal present at terminal W3 of controller 12, the controller initiates operation of the furnace 14 at the third stage or high heat output setting, as indicated at step 110. The controller 12 periodically queries the system 15 to determine if a signal is being generated by the thermostat 16 at terminal W3, as indicated at step 112 in FIG. 6B. If there is no signal at terminal W3 of controller 12 at step 112, the process queries the system 15 to determine if the call for heat signal at terminals W1, W2 has terminated. Accordingly, the controller 12 will cause the furnace 14 to continue to run at the high heat or third stage setting until a call for heat signal is terminated or until a signal calling for heat at terminal W3 ceases to be present, in which case the system 15 will revert to running at the second stage or intermediate output setting, as long as a call for heat signal on terminals W1 and W2 has not been terminated.

Referring further to FIG. 6A, if at step 94 the process running on controller 12 determines that terminals W1 and W2 of the controller are not interconnected or tied together but a signal is present at terminal W1 of the controller, then the furnace 14 is operated in the first stage or low heat output mode, as indicated at step 114. Accordingly, if terminals W1 and W2 of controller 12 are not interconnected or "tied together", the controller operates the furnace 14 at the first stage setting and the process monitors input signals from the thermostat 16 to indicate whether or not a call for heat signal has terminated at step 116. Of course, if the call for heat signal is terminated, the controller 12 causes the furnace 14 to enter the shutoff-postpurge process at step 76 followed by entering the standby mode at step 49 until a call for heat signal is indicated again at step 50.

However, at step 116, if the call for heat signal has not terminated, the controller 12 determines whether or not there is a call for heat at terminal W2 of the controller at step 118. If there is no signal at terminal W2, the system continues to operate at the first stage or low heat output setting of the furnace 14 and cycles through steps 114, 116 and 118. However, if at step 118 the controller 12 determines that there is a signal at its terminal W2, the controller then makes a query to determine whether or not there is also a signal at terminal W3 simultaneously, step 120. If it is indicated that terminals W2 and W3 are tied together in the circuit configuration of FIG. 3, for example, the process carried out by the controller 12 initiates operation of the furnace 14 at its second stage or intermediate heat output rate, as indicated at step 122 in FIG. 6A. The furnace 14 is then operated at the second stage or intermediate heat output rate, a timing cycle is initiated, as indicated at step 122, and the controller 12 then monitors whether or not a call for heat signal is terminated at step 124. If a call for heat signal at terminals W2, W3 is terminated at step 124, the program operating on the controller 12 determines whether or not there is still a signal at terminal W1 of controller 12, as indicated at step 126 in FIG. 6A. If there is no signal at terminal W1 of controller 12, the process commences the shutoff-postpurge procedure via step 76. However, if at step 126, there is still a signal at terminal W1 of controller 12, the process returns to step 114 and continues to operate the furnace 14 at the first stage or low heat output setting and in accordance with the process shown and described.

Referring further to FIG. 6A, if at step 124, the call for heat signal at terminals W2, W3 is not terminated, the controller 12 continues to run the furnace 14 at its second stage setting at step 128, FIG. 6A, while it monitors the timing cycle for expiration, as indicated at step 130. If the timing cycle has not expired, the controller 12 continues to run the furnace 14 at its second stage setting if there is no termination of the signal at terminals W2, W3. However, if at step 130, the timing cycle has expired the controller 12 then initiates operation of the furnace 14 at its third stage or high heat output setting, as indicated at step 132. Still further, the controller 12 monitors operation of the system 15 to determine if a call for heat signal at terminals W2, W3 has been terminated at step 134. If not, the system 15 continues to run the furnace 14 at the third stage setting. If the call for heat signal has terminated on terminals W2, W3, at step 134, a determination is made at step 126 as to whether or not a signal is still present at terminal W1 of controller 12. If so, the controller 12 proceeds to operate the furnace at the first stage setting in accordance with the procedure commencing at step 114. If there is no signal present at terminal W1 of controller 12 at step 126, the shutoff postpurge process is initiated.

If at step 120 it is indicated that terminals W2 and W3 of controller 12 are not interconnected or "tied together", the controller operates the furnace 14 at its second stage setting, as indicated at step 138 in FIG. 6A, and monitors operation for termination of a call for heat signal at step 140. If a call for heat signal at terminal W1 and W2 has not terminated at step 140, the controller 12 determines whether or not a signal is present at its terminal W2 calling for heat, as indicated at step 142. If no signal is present at terminal W2 of controller 12, the process returns to step 114 and the controller causes the furnace 14 to run at its first stage for low heat output setting.

However, at step 142, if a signal is still present at controller terminal W2, the controller 12 determines whether or not a signal is present at its terminal W3, as indicated at step 144 of FIG. 6A. If there is no signal at terminal W3 of controller 12 at step 144, the controller continues to run the furnace 14 at its second stage setting by reentering the process at step 138. However, if a signal is present at terminal W3 of controller 12 at step 144, the controller causes the furnace 14 to begin operating at its third stage setting, as indicated at step 146.

The furnace 14 continues to run at the high output or third stage setting until controller 12 determines whether or not a call for heat signal has been terminated at terminal W1, W2 and W3 at step 148, in which case the process goes to the shutoff postpurge step 76. However, if there is a signal at one or more of terminals W1, W2 and W3 at step 148 the controller 12 determines whether or not there is a signal present at its terminal W3 at step 150. If a signal is still present at terminal W3 of controller 12, the system continues to run furnace 14 at the high heat output or third stage setting, but if there is no call for heat signal at controller terminal W3, the controller 12 causes furnace 14 to begin operating at its second stage or intermediate heat output level in accordance with step 138.

Those skilled in the art will recognize that the controller 12 may be adapted to carry out a process of operating an HVAC system, including one with a furnace 14, for example, if a single stage thermostat is available or a thermostat with a fewer number of stage output signals than that which the system controller is capable of receiving by, for example, making signal transmitting connections as indicated in FIGS. 1 through 3.

An exemplary three stage hot air furnace is described herein. However, other air conditioning units capable of providing conditioned air at multiple levels of output may also benefit from the system and method of the invention. As previously mentioned, the controller 12 may utilize a suitable programmable microcontroller of a type commercially available and capable of being programmed in accordance with the steps of the process, method or routines generally as outlined herein and illustrated in FIGS. 5, 6A and 6B. Hence a system and method of operating an air conditioning unit having three or more levels of conditioned air output, for example, is provided by the arrangement and method of the invention. In other respects, not discussed in detail herein, those skilled in the art may utilize known techniques, methods, materials and components for practicing the present invention.

Although preferred embodiments of the invention have been described in detail herein, those skilled in the art will also recognize that various substitutions and modifications may be made without departing from the scope and spirit of the appended claims.

What is claimed is:

1. An HVAC system controller including:
   at least first, second and third signal inputs for receiving a signal from a thermostat;
   a control routine responsive to simultaneous receipt of a signal on all said signal inputs for generating a first mode of operation of an air conditioning unit;
   a control routine responsive to simultaneous receipt of a signal on said first and second signal inputs to generate a second mode of operation of said unit; and
   a control routine responsive to simultaneous receipt of a signal on said second and third signal inputs for generating a third mode of operation of said unit.

2. The invention set forth in claim 1 wherein:
   said controller is a multistage furnace controller and said first mode of operation comprises controlling said furnace to provide heat output at a low heat output setting.

3. The invention set forth in claim 2 wherein:
   said first mode of operation comprises controlling said furnace to provide heat output at an intermediate heat output setting after a predetermined period of time at said low output setting.

4. The invention set forth in claim 3 wherein:
   said first mode of operation comprises controlling said furnace to provide heat output at a high heat output setting after a predetermined period of time of operation at said intermediate heat output setting.

5. The invention set forth in claim 1 wherein:
   said controller comprises a furnace controller for operating a furnace at least at three settings of heat output and said controller is operable to operate said furnace at said high heat output setting following operation at said intermediate heat output setting as long as there is a signal from said thermostat.

6. The invention set forth in claim 1 wherein:
   said controller is a multistage furnace controller and said second mode of operation comprises controlling said furnace to provide heat output at a low heat output setting for a predetermined period of time.

7. The invention set forth in claim 6 wherein:
   said controller is configured to control said furnace to provide heat output at an intermediate heat output setting following heat output at said low heat output setting.

8. The invention set forth in claim 7 wherein:
   said controller is configured to provide heat output at a high heat output setting following operation at said intermediate heat output setting if a signal is being received simultaneously on two of said signal inputs to said controller.

9. The invention set forth in claim 1 wherein:
   said controller is a multistage furnace controller and said third mode of operation comprises controlling said furnace to provide heat output at an intermediate heat output setting after a predetermined time at a low heat output setting and followed by heat output at a high heat output setting after a predetermined time at said intermediate heat output setting.

10. An HVAC system comprising:
    a furnace having first, second and third stages of operation of heat output;
    a furnace controller operably connected to and controlling said furnace, said controller having a first control input for initiating operation of said furnace at a first stage, a second control input for initiating operation of said furnace at a second stage and a third control input for initiating operation of said furnace at a third stage;
    said controller being operable to be connected to a thermostat capable of generating a single control signal calling for heat and said controller being operable to be connected to a thermostat operable to provide output signals calling for at least two different levels of heat output, said controller including means operable to automatically configure said controller to a predetermined mode of operation depending on whether said first and second control inputs receive a control signal simultaneously or said second and third control inputs receive a control signal simultaneously, or said first, second and third control inputs receive a control signal simultaneously.

11. The system set forth in claim 10 wherein:
    said first control input is the W1 terminal of said controller, said second control input is the W2 terminal of said controller and said third control input is the W3 terminal of said controller.

12. An HVAC system comprising:
an air conditioning unit having first, second and third stages of operations for providing conditioned air output;
a controller operably connected to and controlling said unit, said controller having a first control signal input for initiating operation of said unit at a first stage, a second control signal input for initiating operation of said unit at a second stage and a third control signal input for initiating operation of said unit at a third stage;
said controller being operable to be connected to a thermostat capable of generating a single control signal and to be connected to a thermostat capable of providing output signals calling for at least two different levels of conditioned air output; and
said controller including control means for establishing a first mode of operation of said unit in response to a single signal received on all control signal inputs of said controller, a second mode of operation of said unit in response to simultaneous signals received on a first combination of two of said control signal inputs and a third mode of operation of said unit in response to simultaneous signals received on a second combination of two of said control signal inputs.

13. The system set forth in claim 12 wherein:
said control means is operable to control said unit at said first mode of operation to provide conditioned air output at a low output setting.

14. The system set forth in claim 13 wherein:
said first mode of operation comprises controlling said unit to provide conditioned air output at an intermediate output setting after a predetermined period of time of operation at said low output setting.

15. The system set forth in claim 14 wherein:
said first mode of operation comprises controlling said unit to provide conditioned air output at a high output setting after a predetermined period of time of operation at said intermediate output setting.

16. The system set forth in claim 15 wherein:
said controller is operable to operate said unit at said high output setting following operation at said intermediate output setting as long as there is a signal from said thermostat.

17. The system set forth in claim 12 wherein:
said controller is operable to carry out said second mode of operation comprising controlling said unit to provide conditioned air output at a low output setting for a predetermined period of time.

18. The system set forth in claim 17 wherein:
said controller is configured to control said unit to provide conditioned air output at an intermediate output setting following output at said low output setting.

19. The system set forth in claim 18 wherein:
said controller is configured to control said unit to provide conditioned air output at a high output setting following operation at said intermediate output setting if a signal is being received simultaneously on one combination of two of said control signal inputs to said controller.

20. The system set forth in claim 12 wherein:
said controller is configured to control said unit in said third mode of operation to provide conditioned air at an intermediate output setting followed by operation at a high output setting if a signal is received simultaneously on said second combination of two of said control signal inputs.

21. A method for controlling an air conditioning unit of an HVAC system, said system having a controller operably connected to said air conditioning unit, said controller having three control signal inputs for causing said controller to operate said air conditioning unit at three levels of output of conditioned air, and said system having a thermostat operable to provide at least one control signal calling for output of conditioned air from said air conditioning unit, said method comprising the steps of:
causing said controller to respond to a signal from said thermostat for operation of said air conditioning unit;
determining if said controller is receiving a signal simultaneously at all three control signal inputs, said first and second control signal inputs or said second and third control signal inputs;
causing said controller to operate said air conditioning unit at a low conditioned air output level initially if said controller is receiving a signal from said thermostat simultaneously at all three control signal inputs;
causing said controller to operate said air conditioning unit at said low output level initially if said controller receives a control signal from said thermostat simultaneously at said first and second control signal inputs; and
causing said controller to operate said air conditioning unit at an intermediate output level initially if said controller receives a control signal simultaneously at said second and third control signal inputs.

22. The method set forth in claim 21 including the step of:
causing said controller to operate said air conditioning unit at said low output level if said controller receives a control signal at said first control signal input only.

23. The method set forth in claim 21 including the steps of:
causing said controller to operate said air conditioning unit at said intermediate output level if a control signal is received at said first control signal input and said second control signal input but not said third control signal input.

24. The method set forth in claim 23 including the steps of:
causing said controller to operate said air conditioning unit at a high conditioned air output level if a control signal input is received at all three control signal inputs to said controller.

25. The method set forth in claim 21 including the steps of:
causing said controller to operate said air conditioning unit at said low output level for a predetermined period of time followed by operating said air conditioning unit at said intermediate output level if a control signal continues to be received from said thermostat after expiration of said predetermined period of time.

26. The method set forth in claim 25 including the steps of:
causing said controller to operate said air conditioning unit at said intermediate output level for a predetermined period of time followed by operating said air conditioning unit at a high output level if a signal is being received at said second and third control signal inputs simultaneously after the expiration of said predetermined period of time of operation at said intermediate output level.

27. The method set forth in claim 21 including the step of:
causing said controller to operate said air conditioning unit at said low output level for a predetermined period of time if a control signal is being received by said controller at said first and second control signal inputs simultaneously.

28. The method set forth in claim 27 including the step of:
causing said controller to operate said air conditioning unit at said intermediate output level if a control signal is being received by said controller after expiration of said predetermined period of time of operation at said low output level.

29. The method set forth in claim 28 including the step of:
causing said controller to operate said air conditioning unit at a high conditioned air output level if a signal is received at said third control signal input while a signal is being received simultaneously at said first and second control signal inputs.

30. The method set forth in claim 21 including the steps of:
causing said controller to operate said air conditioning unit at said low output level if a control signal is received only at said first control signal input followed by causing said air conditioning unit to operate at said intermediate output level if a signal is received at said second control signal input.

31. The method set forth in claim 21 including the steps of:
determining if control signals are being received simultaneously at said second and third control signal inputs and causing said controller to operate said air conditioning unit to provide conditioned air at said intermediate output level if control signals are received at said first control signal input and control signals are received simultaneously at said second and third control signal inputs to said controller.

32. The method set forth in claim 31 including the step of:
causing said controller to operate said air conditioning unit to provide a high conditioned air output level after a predetermined time of operation at said intermediate output level.

33. The method set forth in claim 21 including the step of:
causing said controller to operate said air conditioning unit at said intermediate output level if a signal is received at said first control signal input and said second control signal input but not said second and third control signal inputs simultaneously.

34. The method set forth in claim 33 including the steps of:
causing said controller to operate said air conditioning unit at a high conditioned air output level after said operation at said intermediate output level if a control signal is present at said third control signal input.

35. A method for controlling an air conditioning unit of an HVAC system, said system including a controller operably connected to said air conditioning unit, said controller having three control signal inputs for causing said controller to operate said air conditioning unit at three levels of conditioned air output and said system connected to a thermostat operable to provide control signals calling for only two levels of air conditioning, said method comprising the steps of:
responding to a signal at said first control signal input for operation of said air conditioning unit at a low output level;
determining if said controller is receiving a control signal from said thermostat simultaneously at a second control signal input and a third control signal input;
causing said air conditioning unit to operate at a higher level of conditioned air output if said signal is present at said second and third control signal inputs;
monitoring said controller for cessation of a signal at said second and third control signal inputs;
causing said air conditioning unit to revert to said low output level if said signal at said second and third control signal inputs ceases; and
causing said air conditioning unit to shut off if said signal at said first control signal input ceases.

36. The method set forth in claim 35 including the step of:
causing said air conditioning unit to operate at a low output level initially if a control signal is received simultaneously at said first control signal input and said second control signal input.

37. The method set forth in claim 35 including the step of:
determining if a signal is received by said controller at all three control signal inputs essentially simultaneously prior to determining if a signal is present at said second and third control signal inputs.

38. The method set forth in claim 37 including the step of:
causing said air conditioning unit to operate at a high output setting after a predetermined period of time if a signal is received by said controller at all three control signal inputs substantially simultaneously.

39. The method set forth in claim 35 including the steps of:
causing said air conditioning unit to operate at a high output setting if a signal is present at said second and third control signal inputs simultaneously.

40. The method set forth in claim 35 including the step of:
monitoring said controller for cessation of a signal at said first control signal input if said second and third control signal inputs are not receiving a signal.

41. The method set forth in claim 35 wherein:
said air conditioning unit comprises a multistage furnace having at least one controllable element for generating heat output at three different levels.

* * * * *